(12) United States Patent
Grant et al.

(10) Patent No.: US 11,316,568 B2
(45) Date of Patent: Apr. 26, 2022

(54) CONTROLLABLE BEAM MANAGEMENT ACCURACY (71) Applicant: TELEFONAKTIEBOLAGET LM ERICSSON (PUBL), Stockholm (SE)

(72) Inventors: Stephen Grant, Pleasanton, CA (US); Mattias Frenne, Uppsala (SE); Andreas Nilsson, Gothenburg (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 288 days.

(21) Appl. No.: 16/476,841

(22) PCT Filed: Dec. 29, 2017

(86) PCT No.: PCT/IB2017/058518
§ 371 (c)(1),
(2) Date: Jul. 9, 2019

(87) PCT Pub. No.: WO2018/127780
PCT Pub. Date: Jul. 12, 2018

(65) Prior Publication Data
US 2021/0288702 A1  Sep. 16, 2021

Related U.S. Application Data

(60) Provisional application No. 62/444,064, filed on Jan. 9, 2017.

(51) Int. Cl.
*H04L 1/02* (2006.01)
*H04B 7/06* (2006.01)

(52) U.S. Cl.
CPC ......... *H04B 7/0617* (2013.01); *H04B 7/0695* (2013.01)

(58) Field of Classification Search
CPC ....... H04L 1/0618; H04L 1/06; H04L 5/0023; H04B 7/0626; H04W 72/042; H04W 72/085; H04W 72/048
(Continued)

(56) References Cited

U.S. PATENT DOCUMENTS 8,412,841 B1  4/2013  Swaminathan et al.
8,510,375 B2  8/2013  Bouazizi
(Continued)

FOREIGN PATENT DOCUMENTS

EP  1216524 A2  6/2002
EP  2908535 A1  8/2015
(Continued)

OTHER PUBLICATIONS

NEC Group, "Reference signals for demodulating R-PDCCH channel", TSG-RAN WG1#60, R1-101322, San Francisco, CA (Feb. 22-26, 2010). (6 pages).
(Continued)

*Primary Examiner* — Khai Tran (57) ABSTRACT

In one aspect there is provided a process for beam management. In some embodiments, the process includes: a TRP classifying a data session between the TRP and a UE into one of at least two classifications; and the TRP selecting a
(Continued)

beam management procedure for managing one or more BPLs between the TRP and the UE based on the classification into which the data session is classified.

20 Claims, 4 Drawing Sheets

(58) Field of Classification Search
USPC .......................................... 375/267, 260, 262
See application file for complete search history.

(56) References Cited

U.S. PATENT DOCUMENTS

| | | | |
|---|---|---|---|
| 8,843,596 | B2 | 9/2014 | Goel et al. |
| 9,237,387 | B2 | 1/2016 | Bocharov et al. |
| 9,832,534 | B2 | 11/2017 | Tokumo et al. |
| 10,148,715 | B2 | 12/2018 | Rhyu et al. |
| 2009/0209264 | A1 | 8/2009 | Yang et al. |
| 2012/0016965 | A1 | 1/2012 | Chen et al. |
| 2013/0132507 | A1 | 5/2013 | Swaminathan et al. |
| 2013/0198335 | A1 | 8/2013 | Goel et al. |
| 2014/0092827 | A1 | 4/2014 | Jöngren et al. |
| 2014/0126485 | A1 | 5/2014 | Chen et al. |
| 2015/0117382 | A1* | 4/2015 | Wang ............... H04L 5/0082 370/329 |
| 2016/0044609 | A1* | 2/2016 | Handa ............... H04W 52/365 370/329 |
| 2016/0323898 | A1* | 11/2016 | Jo .................. H04W 72/048 |
| 2017/0033854 | A1* | 2/2017 | Yoo ................. H04W 24/00 |
| 2017/0208366 | A1 | 7/2017 | Tokumo et al. |
| 2017/0230436 | A1 | 8/2017 | Rhyu et al. |
| 2018/0070148 | A1 | 3/2018 | Tokumo et al. |
| 2019/0069038 | A1 | 2/2019 | Phillips |
| 2020/0221427 | A1* | 7/2020 | Nilsson ............. H04W 36/305 |

FOREIGN PATENT DOCUMENTS

| | | |
|---|---|---|
| EP | 3082270 A1 | 10/2016 |
| JP | 2015527026 A | 9/2015 |
| JP | 2016506667 A | 3/2016 |
| WO | 2014036150 A1 | 3/2014 |
| WO | 2014098542 A1 | 6/2014 |
| WO | 1016/044069 A1 | 3/2016 |

OTHER PUBLICATIONS

ZTE et al., "High level views on beam management for NR-MIMO", 3GPP TSGRAN WG1 Meeting #86bis, R1-1608664, Lisbon Portugal (Oct. 10-14, 2016). (5 pages).

Bouzakaria, N. et al., Overhead and Performance of Low Latency Live Streaming Using MPEG-DASH, The 5th International Conference on Information, Intelligence, Systems, and Applications, Jul. 7, 2014, pp. 1-6, IEEE.

Ericsson, "Discussion on QCL," 3GPP TSG-RAN WG1 #86bis, R1-1609766; Lisbon, Portugal, Oct. 10-14, 2016, 6 pages.

Houze et al., "Applicative-Layer Multipath for Low-Latency Adaptive Live Streaming", IEEE ICC; May 2016.

Intel Corporation, "UE beamforming impacton downlink control channel design", 3GPP TSG RAN WG1 #86, R1-166567, Aug. 13, 2016, Gothenburg, Sweden.

International Organization for St an Dard Iza Tion, "Information Technology—Dynamic Adaptive Streaming Over HTTP (DASH)—Part 1: Media Presentation Description and Segment Formats", International Standard, ISO/IEC 23009-1, 2nd Ed., May 15, 2014, pp. 1-176, ISO.

Stockhammer, T., "Dynamic Adaptive Streaming Over HTTP—Standards and Design Principles", Proceedings of the Second Annual ACM Conference on Multimedia Systems, Feb. 23, 2011, pp. 133-143.

Swaminathan, V. et al., "Low Latency Live Video Streaming Using HTTP Chunked Encoding", 2011 IEEE 13th International Workshop on Multimedia Signal Processing, Oct. 17, 2011, pp. 1-6, IEEE.

Huawei et al., "Discussion on control channel design", 3GPP TSG RAN WG1 Meeting #86, R1-167203, Aug. 22-26, 2016, Gothenburg, Sweden.

Ericsson, "Beam management principles", 3GPP TSG-RAN WG1#86bis, R1-1609754, Sep. 30, 2016, Lisbon, Portugal.

Interl Corporation, "On QCL to support UE beam management", 3GPP TSG-RAN WG1#86bis, R1-1609525, Oct. 10-14, 2016, Lisbon Portugal.

Nokia et al., "Beam management-DCI monitoring", 3GPP TSG-RAN WG1#86bis, R1-1610240, Oct. 10-14, 2016, Lisbon, Portugal.

* cited by examiner

CONTROLLABLE BEAM MANAGEMENT ACCURACY

RELATED APPLICATIONS

This application is a national stage application of International Patent Application No. PCT/IB2017/058518, filed Dec. 29, 2017, which claims the benefit of U.S. provisional patent application Ser. No. 62/444,064, filed Jan. 9, 2017, the disclosures of which are hereby incorporated herein by reference in their entirety.

TECHNICAL FIELD

Disclosed are embodiments for controllable beam management accuracy.

BACKGROUND

The next generation mobile wireless communication system, which is referred to as "5G", will support a diverse set of use cases and a diverse set of deployment scenarios. 5G will encompass an evolution of today's 4G networks and the addition of a new, globally standardized radio access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. One solution to the coverage issue is to employ high-gain beamforming to achieve satisfactory link budget. With such high-gain beamforming, the beams are typically quite narrow which makes beam tracking challenging—i.e., finding, maintaining, and switching between suitable beams as a user equipment (UE) (e.g., a device, such as, for example, a smartphone, a sensor, etc., that is capable of wireless communication) moves both within and between the coverage areas of multi-beam transmission points (TRPs) (a.k.a., "transmit-receive points").

Beamforming implies transmitting the same signal from multiple antenna elements of an antenna array with an amplitude and/or phase shift applied to the signal for each antenna elements. These amplitude/phase shifts are commonly denoted as the antenna weights and the collection of the antenna weights for each of the antennas is a precoding vector. Different precoding vector give rise to a beamforming of the transmitted signal and the weights can be controlled so that the signals are coherently combining in a certain angle direction as seen from the antenna array in which case it is said that a beam is formed in that direction. If the antennas of the array are placed in two dimensions, i.e. in a plane, then the beam can be steered in both azimuth and elevation directions with respect to the plane perpendicular to the antenna array.

In 3GPP, at least two broad classifications for beam handling have been identified for multi-beam systems: (1) connected mode mobility between a beam transmitted by a source (or serving) TRP and a beam transmitted by a target TRP, where the target is a TRP with which the UE has not established or maintained synchronization; and (2) beam management where beam tracking is required due to UE movement, and the beams are typically transmitted by the same (serving) TRP with which the UE continually maintains time and frequency synchronization. This disclosure applies to the latter procedure, i.e., beam management. In what follows, we refer to a beam-pair link (BPL), which is defined as a pair of beams consisting of i) a suitable transmit (TX) beam used by a TRP ("TRP TX beam" or "TRP beam" for short) and ii) a suitable receive (RX) beam used by a UE ("UE RX beam" or "UE beam" for short).

One approach for robust beam management in a multi-beam system is the maintenance of both a primary or active BPL used for ongoing transmission and reception of data and control signals, and a monitored BPL used for fallback purposes. Typically, both the active and monitored BPLs are updated as the UE moves and new/better beams are discovered. In some sense, this is analogous to active set updates, e.g., in 3G communication systems (UMTS). The maintenance of the BPLs is typically achieved through UE measurement and feedback to the TRP of the received quality (e.g., strength) of reference signals (RS) transmitted semi-persistently/periodically from the TRP on different beams. Furthermore, the reference signal transmissions on a given TRP beam may be repeated to allow the UE a chance to adjust/optimize its RX beam.

The maintenance of a monitored BPL is important for robust communication in the case that the active BPL becomes blocked, either by an object that moves into the active BPL path or an object behind which the UE moves and becomes shadowed. Blocking is common at high frequencies where penetration loss through objects is high and diffraction around object edges is poor. When such blocking or other like disruption occurs, we refer to the event as a "beam pair link failure" (BPLF). BPLF can occur either slowly/gradually or very suddenly depending on the UE speed and the motion of objects in the environment. The narrower the beams, the more chance there is for sudden BPLFs to occur. To recover from a BPLF on the active BPL, the TRP and UE should switch together to the monitored BPL.

Reference Signals, Antenna Ports and Quasi Co-Location (QCL)

In LTE, reference signals (RSs) used for channel estimation are equivalently denoted as antenna ports. Hence a UE can estimate the channel from one antenna port by using the associated RS. One could then associate a certain data or control transmission with an antenna port, which is equivalent to say that the UE shall use the RS for that antenna port to estimate the channel used to demodulate the associated control or data channel. One could also say that the data or control channel is transmitted using that antenna port.

In LTE, the concept of quasi-co location has been introduced in order to improve the channel estimation performance when demodulating control or data channels. The concept relies on that the UE could estimate long term channel properties from one reference signal in order to tune its channel estimation algorithm. For instance, the average channel delay spread can be estimated using one antenna port and used when demodulating a data channel transmitted using another antenna port. If this is allowed, it is specified that the first and second antenna port are quasi co-located (QCL) w.r.t average channel delay spread.

Hence, as used in LTE specifications, two antenna ports are "quasi co-located" if the large-scale channel properties of the channel over which a symbol on one antenna port is conveyed can be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties can include one or more of received power for each port, received timing (i.e., timing of a first significant channel tap), a number of significant channel taps, and frequency shift. By performing channel estimation algorithm tuning based on the RSs corresponding to the quasi co-located antenna ports, a quality of the channel estimation is substantially improved.

In NR, it has been agreed to introduce QCL for spatial properties of the channel on top of those QCL parameters use for LTE. By complementing the existing QCL framework with new QCL parameters that depends on spatial channel properties, we can allow a UE to perform spatial processing across different signal types without violating the rule that a UE is not allowed to use measurements from one reference signal to assist in the reception or processing of another signal unless explicitly specified.

Examples of such spatial processing is analog receiver beamforming, and channel estimation using spatial processing gain to improve the channel estimate.

Assume communication between two nodes in a network, a TRP and a UE. The TRP transmits a first set of reference signals (RSs) from one or multiple transmit antenna ports. The UE receives the transmitted reference signals using one or multiple receive antenna ports and determines or estimates, based on the received first set of transmitted RS, one or more parameters capturing a spatial property of the channel. The UE determines an indication that a second set of transmitted RS from one or multiple transmit antenna ports are quasi co-located (QCL) with the said first RS, where the QCL is given with respect to the one or more parameters capturing a spatial property of the channel. The TRP transmits the second set of transmit RS from one or multiple transmit antenna ports. The UE utilizes one or more of the determined parameters capturing a spatial property of the channel that is based on the first set of RS, to assist in the reception of the second set of RS.

In other words, the UE can use the same RX beamforming weights to receive the second signals and associated RS (such as a control or a data transmission DMRS) as the RX beamforming weights it used when it received a first signal (for example a measurement signal, e.g. CSI-RS) if the second RS is QCL with the first RS with respect to spatial parameters.

A QCL parameter related to a spatial property is related to the UE RX beamforming or UE RX reception parameters. Hence, if the UE use two different spatial QCL parameters can indicate that the UE use two different RX beamforming weights (or equivalently two different ways of combining the signals from the UE RX antennas).

Spatial parameters could be angle of arrival, angular spread or spatial correlation, spatial correlation matrix on the RX side or on the TX side.

In 3GPP RAN1, it has been agreed that NR supports with and without a downlink indication (from the NR base station ("gNB") to UE) to derive QCL assumptions for assisting UE side beamforming for downlink control channel reception.

SUMMARY

The process of establishing and maintaining a primary (active) BPL and a secondary (monitored) BPL for robustness purposes takes some time, e.g., tens of ms. In today's networks, however, the traffic profile is such that a large fraction of data sessions are short (e.g., 90% of data sessions are short). Often DL and/or UL data within a session can be delivered in just a few transmission opportunities, spanning a very few milliseconds. Hence there is often not enough time to build in robustness and data throughput optimizations for the control or data channels, respectively. For those data sessions that are long enough, however, it is highly desirable to support such optimizations to create a good user experience in terms of link retainability and integrity (performance). Clearly, there is a need for a controllable beam management mechanism that can address both scenarios in a seamless and dynamic way.

Embodiments disclosed herein cover a controllable approach for supporting a baseline beam management procedure that works well in the case of short data sessions and seamlessly transitioning to an extended beam management procedure that adds robustness and throughput optimization for longer data sessions. In some embodiments, the controlling mechanism is based on the TRP (e.g., NR base station (gNB)) observations of the status of DL and/or UL transmit buffers. For the DL transmit buffers, which are maintained by the TRP, the buffer status is directly observable by the TRP. For the UL transmit buffers in the UEs, the TRP can determine the buffer status of an UL transmit buffer indirectly through a so-called buffer status report (BSR). BSRs are used in both 3G and 4G (LTE) UEs to inform the TRP (NB/eNB) of the amount of data the UE has to transmit to the TRP, which information may be used by the TRP in making scheduling decisions. Advantageously, in some embodiments, BSRs are used by the TRP to classify a data session (e.g., determine whether the data session is long or short), and then based on this classification of the data session, invoke either the baseline or extended beam management procedures.

Accordingly, in one aspect, there is provided a method for dynamically switching between a baseline beam management procedure and an extended beam management procedure based on observations/feedback of the transmit buffer status in the DL/UL. The baseline procedure is typically used as a starting point, and the extended procedure is invoked if the buffer status indicates a long data session duration. Additionally, the TRP can consider other factors in deciding to invoke the extended beam management procedure, e.g., path gain (loss), UE mobility, etc.

In another aspect there is provided a process for beam management. In some embodiments, the process includes: a TRP classifying a data session between the TRP and a UE into one of at least two classifications; and the TRP selecting a beam management procedure for managing one or more BPLs between the TRP and the UE based on the classification into which the data session is classified. In some embodiments, the TRP classifies the data session based on transmit buffer status information indicating a status of one or more of a DL transmit buffer and an UL transmit buffer.

In other embodiments, the process includes: the TRP selecting a TRB beam for use in transmitting data to the UE as part of a data session with the UE; the TRP determining that the data session with the UE should be classified as a long data session; and, as a result of determining that the data session should be classified as a long data session, the TRP establishes a monitored BPL for the UE.

An advantage of the embodiments disclosed herein is that they provide a seamless mechanism to build in robustness and data throughput optimizations only when they are needed (long data sessions) and rely on baseline beam management procedures for short data sessions where the focus needs to be on quick, opportunistic delivery of data in a robust way.

BRIEF DESCRIPTION OF THE DRAWINGS

The accompanying drawings, which are incorporated herein and form part of the specification, illustrate various embodiments.

DETAILED DESCRIPTION

As mentioned above, the maintenance of a monitored BPL is important for robust communication in the case that the active BPL becomes blocked (i.e., the BPL experiences a BPLF), either by an object that moves into the active BPL path or an object behind which the UE moves and becomes shadowed. To recover from a BPLF on the active BPL, the TRP and UE should switch together to the monitored BPL. This process is illustrated in FIGS. 1A, 1B and 1C.

Figure 1A:
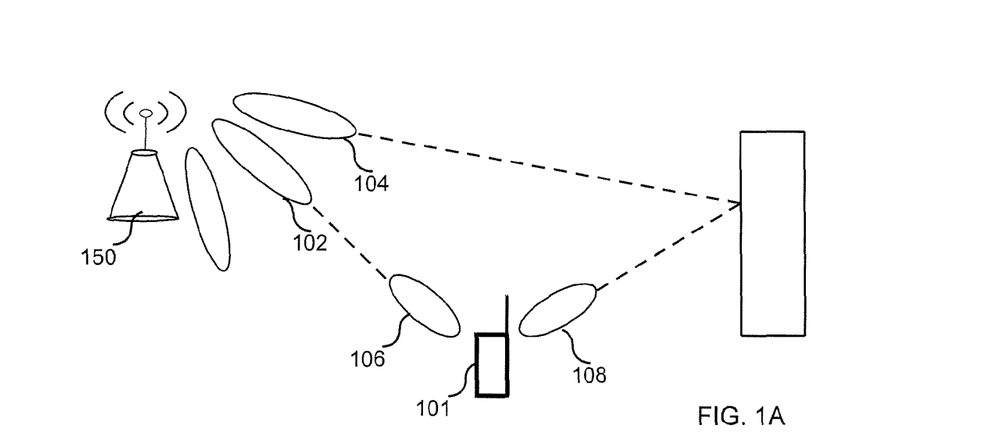
FIGS. 1A, 1B and 1C illustrate the use of active and monitored BPLs for communications between a TRP and a UE.

In FIG. 1A, there is shown a TRP 150 (e.g., a base station) using one active BPL for UE 101 to transmit data to the UE 101 (e.g., control signaling and/or user data) and further using one monitored (backup) BPL for the UE 101. While FIGS. 1A, 1B, and 1C illustrate a single TRP communicating with the UE, in other embodiments two or more TRPs may be communicating with the TRP, wherein one of the TRPs uses the active BPL to communicate with the UE and another of the TRPs uses the monitored BPL to communicate with the UE. The active BPL comprises active TRP TX beam 102 and the corresponding active UE RX beam 106, and the monitored BPL comprises the monitored TRP TX beam 104 and the corresponding monitored UE RX beam 108. As used herein a beam is a spatial filtering configuration, such as, for example, antenna weights. Hence, a TX beam may be referred to as a TX spatial filtering configuration.

Figure 1B:
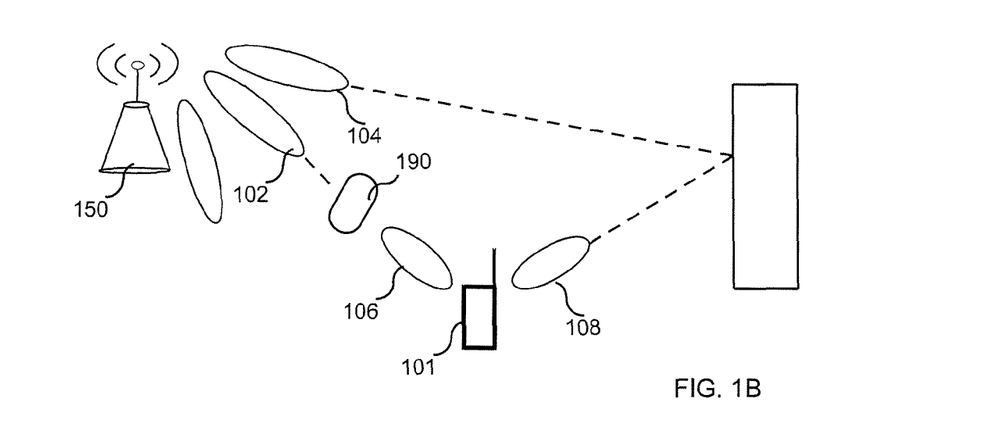

In FIG. 1B there is shown an object 190 that is blocking the active BPL, thereby causing the UE to detect a BPLF with respect to the active BPL (i.e., the active TRP TX beam/active UE RX beam pair). A problem arises in that the TRP cannot switch to the monitored BPL since the UE is still monitoring the UE RX beam 106 corresponding to the active TX beam 102 as the UE is unaware of the blocking. Moreover, the TRP may also be unaware of the blocking situation.

Figure 1C:
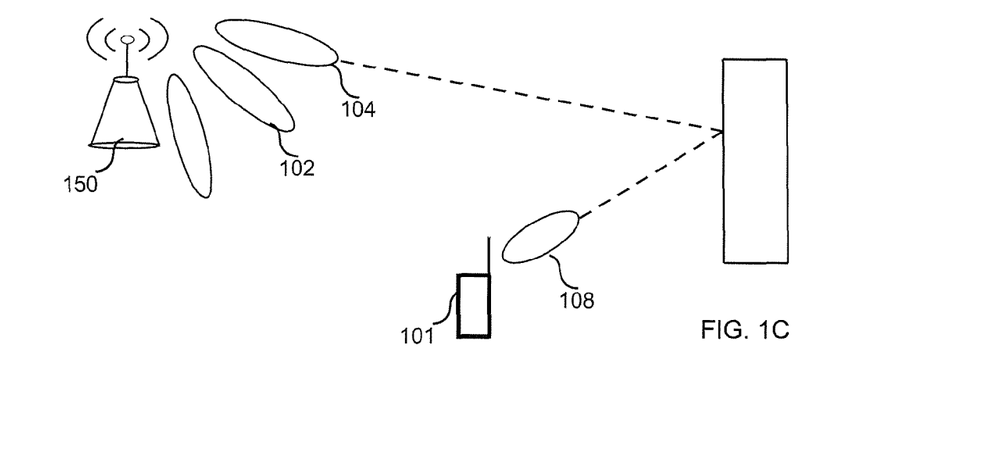

To restore the connection between the TRP and the UE, the TRP can use the monitored BPL as the active BPL for the UE, as illustrated in FIG. 1C. However, to efficiently perform this beam switching, the TRP must first signal to the UE that it will start using the monitored BPL as the active BPL, otherwise the UE will not know which UE RX beam to use during reception (i.e., RX beam 106 or RX beam 108). This is problematic because the active BPL, which is used for control signaling, is blocked and has poor or non-existing channel quality. If the blocking happens slowly, there may be time to perform this signaling before the signal degrades too much. There is a risk that the blocking will happen too quickly such that the TRP does not have time to signal a "beam switch" (a.k.a., "BPL switch") to the UE, and in this case the UE will continue to use the RX beam 106 corresponding to the TX beam 102 that is now blocked.

As noted in the summary section above, the process of establishing and maintaining a primary (active) BPL and a secondary (monitored) BPL for robustness purposes takes some time. In today's networks, however, the traffic profile is such that a very large fraction of data sessions are short in duration. Consequently, there is often not enough time to build in robustness and data throughput optimizations for the control or data channels, respectively. For those data sessions that are long enough, however, it is highly desirable to support such mechanisms to create a good user experience.

Accordingly, embodiments disclosed herein use a baseline beam management procedure for short data sessions and an extended beam management procedure that adds robustness and throughput optimization for longer data sessions. As discussed above, a data session can be characterized as short or long based on an uplink feedback from the terminal to the network. Such feedback may for instance consist of buffer status information. Such feedback may alternatively be a dedicated signal from the terminal. In one embodiment, the dedicated signal indicates a request for extended beam management. In another embodiment, the dedicated signal indicates indirectly that that data session is long, for example, by an indication of the service type, e.g., in a connection setup procedure. Service type, for example, could correspond to fie download/upload, high rate video session, etc. Hence, in some embodiments, the uplink feedback, such as the BSRs, are used by the TRP to classify a data session (e.g., determine whether the data session is long or short), and then based on this classification of the data session, invoke either the baseline or extended beam management procedures The baseline procedure provides a coarse level of accuracy. The baseline procedure is appropriate for short data sessions where, for example, a UE spends very little time in the RRC_CONNECTED state. The baseline procedure aims to quickly find a suitable (coarse, "good enough") beam pair link (BPL), deliver the data in one or only a few transmission opportunities, and then go back to IDLE or RRC_INACTIVE. In the baseline procedure, the focus is on quick, opportunistic data delivery rather than on robustness and throughput optimization. In today's networks, the traffic profile is such that a large fraction of data sessions are short. Hence, it is envisioned that the baseline procedure is used in most cases.

The extended procedure provides an enhanced level of accuracy, and is appropriate for longer data sessions where, for example, user experience in terms of link retainability and integrity (performance) is important. In this case, the UE spends more time in the RRC_CONNECTED state, allowing the network to build in robustness and data throughput optimizations for both the control and data channels before the UE goes back to IDLE or RRC_INACTIVE state.

Embodiments provide an approach to seamlessly determine whether the baseline or extended procedure should be invoked. This decision is based on knowledge of the transmit buffer status in either or both of the DL or UL. In the DL, the transmit data buffer status is directly observable by the TRP. In the UL, the TRP determines the transmit data buffer status indirectly through buffer status reports (BSR) which are transmitted from the UE to the TRP once the UE is in CONNECTED state.

Typically, the baseline procedure is used as a starting point. Then, once the TRP determines that a data session will be long based on, for example, UL buffer status, DL buffer status, and/or a dedicated UL feedback signal from the UE, the TRP decides whether or not the extended procedure should be invoked. In another embodiment, the TRP takes into account other factors in its decision to invoke the extended procedure. Such other factors could include estimates of the path gain to the UE. In the case of large path gain (low loss), the extended procedure may not be needed. Another factor could include estimates of the UE mobility.

For a high speed UE, establishing and maintaining multiple beam pair links may be difficult. Furthermore, potential blockage events may not last long, hence the extra robustness from having a secondary (monitored) BPL may not be as important compared to lower speed UEs where blockage events can last for a relatively long time.

In the following two sub-sections, illustrative examples of the baseline and extended procedures are provided for context.

A. The Baseline Procedure Beam Management Procedure

The baseline procedure beam management procedure is characterized by the establishment of a single beam-pair link (BPL) to be used for both control (PDCCH and PUCCH) and data transmission (PDSCH and PUSCH). A BPL consists of the link between the TRP and a UE considering a particular TRP TX beam and UE RX beam. The establishment procedure is transparent to the UE in the sense that no explicit downlink signaling is used to inform the UE of what TRP TX beam is used or what UE RX beam should be used. Hence, this is the case of operation without downlink indication as agreed in 3GPP. To enable this, the TRP periodically transmits a sweep of multiple beamformed CSI-RS resources. TRP TX beam selection is accomplished through CSI-RS Resource Indicator (CRI) feedback from the UE, similar to "Class B, K>1" operation in LTE. The feedback also includes CSI (RI/PMI/CQI) to allow direct scheduling of the UE. Alternatively, only a CSI-RSRP feedback can be configured as the feedback from the sweep, which can be used for rudimentary, coarse link adaptation.

An illustrative sequence of steps in the baseline procedure is as follows:

Step 1:

The TRP configures the UE to measure and report on multiple (K) beamformed periodic CSI-RS resources when the UE transitions from IDLE to CONNECTED, or when the UE hands over to a new cell. For example, the different resources correspond to different TRP TX beams that cover the whole service area for the TRP. In LTE, this configuration occurs in the RRC Connection Setup procedure (part of Msg4) or the RRC Connection Reconfiguration procedure as part of a handover. Covering the whole service area in a periodic beam sweep is efficient for the case of moderate to high load where there are a sufficient number of UEs undergoing state changes and/or handover. At low load, it could be more efficient (in terms of resource utilization) to rely on aperiodic CSI-RS transmission on a UE specific basis. In this case, if the TRP has some rough a priori knowledge of user location, e.g., a coarse beam direction obtained during the RACH procedure, then the beamformed CSI-RS resources could be constrained to cover a local area around the coarse beam direction; however, this is transparent to the UE.

Step 2:

The UE determines an initial UE RX beam without dedicated network (NW) assistance. Unless the UE has some a priori knowledge of a suitable beam direction, it will need to use a wide (sector covering) beam. Hence the system must be dimensioned to ensure sufficient PDCCH coverage even if the UE is not using RX beamforming.

Step 3:

Depending on the configuration, the UE reports CRI indicating the best TRP TX beam in combination with CSI(RI/PMI/CQI) for that beam, or RSRP for multiple of the K beams. The UE will likely need to use a wide (sector covering) TX beam for transmission of the CSI report, e.g., over PUCCH. Likewise, the TRP will most likely need to use a wide RX beam for reception of the CSI report. Hence, in some embodiments, the system is dimensioned to ensure sufficient PUCCH coverage even without UE TX and TRP RX beamforming.

Step 4:

The TRP selects a TX beam based on the UE report and uses that TX beam for both PDCCH and PDSCH transmissions for the UE taking into account the reported CSI. No explicit DL signaling is necessary to indicate the selected TRP TX beam. In addition, the TRP may use the same beam direction for future reception of PUCCH/PUSCH as long as TX/RX correspondence holds at the TRP.

Step 5:

The TRP determines the expected duration of the data session through its observability of DL/UL buffer status. Since much of the DL/UL traffic consists of short data sessions, it may often happen that all data has been delivered in one or at most a few time slots. If so, then the baseline procedure as described above is all that is necessary for a given UE. For longer data sessions, but not long enough to invoke the extended procedure described in the next section, it may be beneficial to refine the TRP TX and/or UE RX beams.

Accordingly, in addition to the above steps, there could be further steps related to refinement of the BPL. These further steps may include:

Step 6a:

The TRP triggers a UE RX beam sweep based on configuring one or more aperiodic (UE specific) beamformed CSI-RS resources. For example, if the CSI-RS resources are drawn from an RRC configured pool, the pre-configuration may be performed at the same time as initial connection setup (described above). Then, the needed CSI-RS resources for this step could be dynamically allocated from the pool when needed. The beamformed CSI-RS resources are constrained to cover a local area around the previously used TRP TX beam. In this procedure, each CSI-RS beam is fixed for some number of time units while the UE tries different RX beams.

Step 6b:

The UE feeds back CRI indicating the best TRP TX beam and simultaneously updates its own RX beam. The CRI report is accompanied by a CSI report corresponding to the refined BPL.

Step 6c:

The TRP updates its TX beam based on the CRI report from the UE (i.e., the TRP may select a new TRP TX beam for us transmitting data to the UE). This refined BPL is used for the remaining PDCCH/PDSCH transmissions in the data session.

B. The Extended Procedure Beam Management Procedure

The extended procedure beam management procedure is intended for long data sessions where there is time to build in extra robustness for PDCCH transmission and optimize PDSCH transmissions. The extended procedure is characterized by establishment of at least a second BPL to be used for PDCCH robustness purposes (the extended procedure is described in U.S. provisional patent application No. 62/417,633, which is attached hereto as Appendix B). The first BPL is referred to as the "active BPL," and the second (backup) one as the "monitored BPL." The purpose of having two BPLs is for recovery from sudden blocking events that can occur at mmW frequencies. The UE, in some embodiments, periodically searches for PDCCH transmissions on the monitored BPL with a relatively low duty cycle, e.g., 1 in 10 slots. The periodicity is agreed between TRP and UE such that the LIE knows to switch its RX beam to search for the PDCCH on the monitored BPL during the appropriate slot. In this way, if the active BPL is blocked, PDCCH still gets through. This can be detected at the TRP, and if the blockage continues, the TRP can switch BPLs such that the monitored BPL becomes the new active BPL. Maintaining two BPLs and possibly switching between them requires the use of a BPL identifier, or tag, for the TRP to indicate to the UE which BPL is updated on an ongoing basis. Hence, this is the case of operation with downlink indication as in the above agreement.

An illustrative sequence of steps in the extended procedure is as follows:

Step 1:

The TRP triggers a refinement of the first (active) BPL using the same procedure as in Step 6 above for the baseline procedure, except that when the CSI measurement is triggered, the TRP also transmits an identifier to the UE, e.g., 2 bits, which is used to indicate which BPL is being updated. For example, the 2-bit identifier could be set to '00' which is reserved for the active BPL.

Step 2:

The UE stores (remembers) the refined RX beam setting according to the identifier for the active BPL.

Step 3:

The TRP triggers the establishment of a second (monitored) BPL using, for example, the same procedure as in Step 6 above, except that it avoids using the same TRP TX beam as the active BPL. Furthermore, it may configure a beam sweep over a wider area than that used to refine the active BPL in order to discover a new link. Along with the CSI measurement trigger, the TRP transmits a 2-bit identifier with value set, e.g., to '01' to indicate that the TRP TX beam and UE RX beam is being updated for the monitored link.

Step 4:

The UE stores (remembers) the RX beam setting according to the identifier for the monitored BPL. The UE then switches back to the RX beam used for the active BPL for reception of the next PDCCH transmission.

Step 5:

On an "as needed" basis, the TRP triggers further refinements/updates of both the active and monitored BPLs using the same process as above.

Step 6:

The UE searches for PDCCH transmissions most of the time on the active BPL. With a lower duty cycle (agreed between TRP and UE), the UE searches for PDCCH transmissions on the monitored BPL. In the case that the active BPL becomes blocked, PDCCH transmission may still be received by the UE as long as the monitored BPL does not suffer a similar blocking.

Step 6a:

If the active BPL remains blocked, the TRP may trigger a switch of the BPLs such that the monitored BPL becomes the new active BPL. The UE responds by switching its RX beams such that the PDCCH is monitored most often on the new active BPL and less frequently on the new monitored BPL.

Step 6b:

The TRP may then trigger an update of the monitored BPL to find a better (unblocked) link.

Step 7:

If both BPLs become blocked (catastrophic condition) then the UE may declare a radio link failure and initiate an RRC Connection Re-establishment procedure as in LTE. This process is UE initiated through a RACH attempt to the previous or a new cell. Once re-connected, the beam management process starts again with the baseline procedure and moves to the extended procedure if still needed.

Step 8:

In addition to establishing active/monitored links for PDCCH robustness, the TRP may establish a 2nd active BPL, not to be used for PDCCH transmissions, using a different identifier value, e.g., '11.' The additional active link may be used for optimizing PDSCH performance. For example, higher rank transmission could be supported for D-MIMO or multi-panel transmission. Since the establishment of BPLs may take some time, this optimization is intended for longer data sessions, thus fits better in the extended, rather than baseline procedure.

Figure 2:
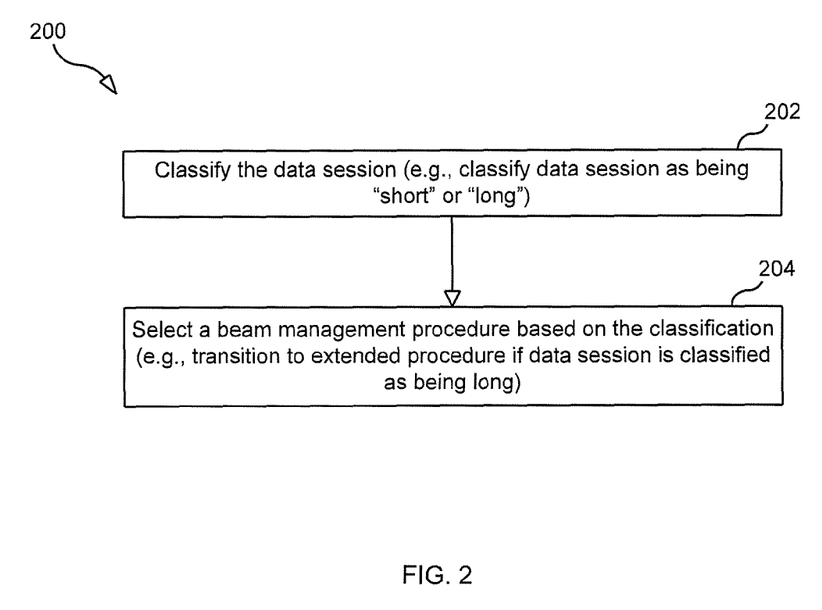
FIG. 2 is a flow chart illustrating a process according to one embodiment.

FIG. 2 is a flow chart illustrating a process 200, according to some embodiments. Process 200 may begin in step 202 in which the TRP classifies a data session between the TRP and a UE into one of at least two classifications. In step 204, the TRP selects a beam management procedure for managing one or more BPLs between the TRP and the UE based on the classification into which the data session is classified (e.g., the TRP transitions to the extended procedure if data session is classified as being long). In some embodiments, in step 202, the TRP classifies the data session based on i) transmit buffer status information indicating a status of one or more of a DL transmit buffer and an UL transmit buffer and/or ii) an UL signal from the UE (e.g., an UL signal from the UE that indicates indirectly that that data session is long, for example, by an indication of the service type or an UL signal from the UE that explicitly requests extended beam management).

Figure 3:
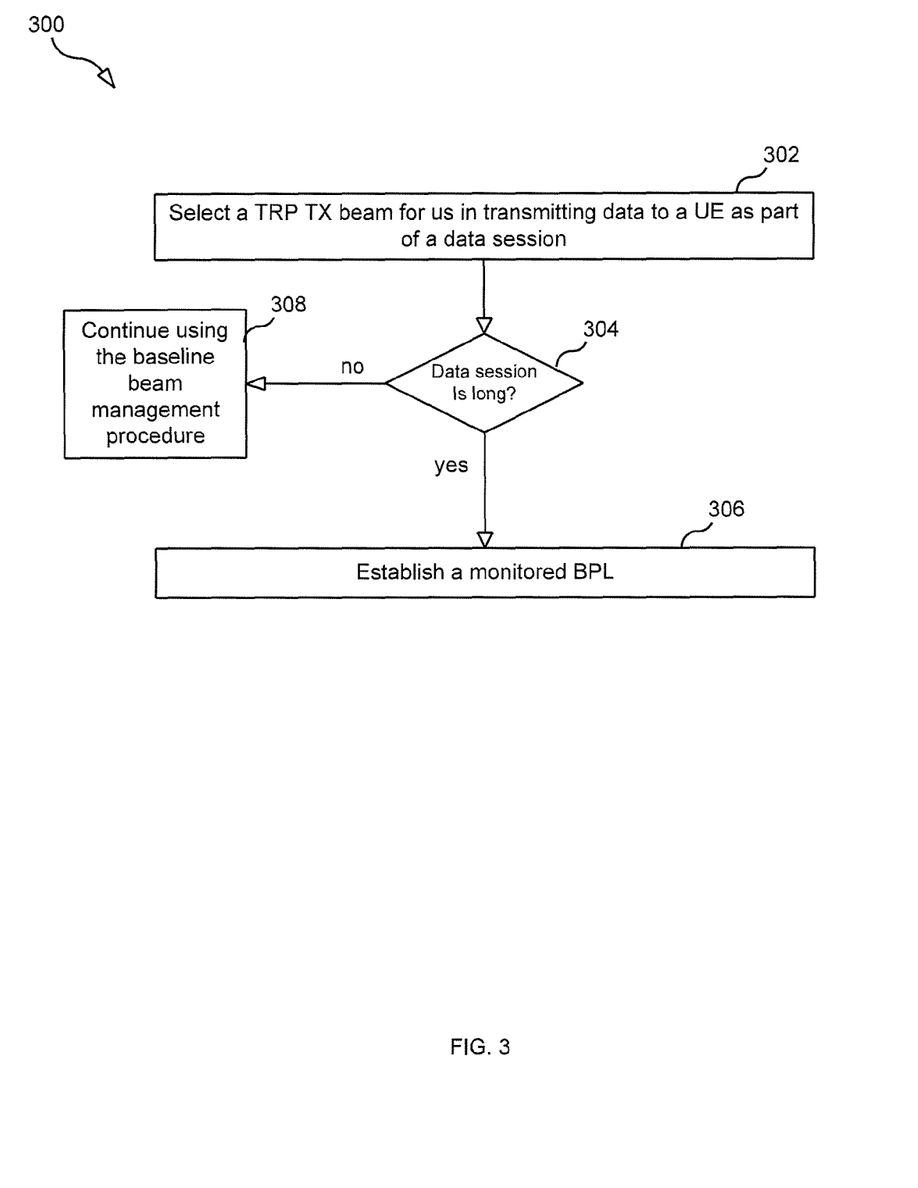
FIG. 3 is a flow chart illustrating a process according to one embodiment.

FIG. 3 is a flow chart illustrating a process 300, according to some embodiments. Process 300 may begin in step 302 in which the TRP selects a TRP TX beam for use in transmitting data to the UE as part of a data session with the UE. In step 304, the TRP determines whether the data session with the UE should be classified as a long data session in the same manner as described above with reference to step 202.

If the TRP determines that the data session with the UE should be classified as a long data session, then the process proceeds to step 306, otherwise it proceeds to step 308. In step 306, as a result of determining that the data session should be classified as a long data session, the TRP establishes a monitored TRP TX beam (a monitored BPL) for the UE. In some embodiments, establishing a monitored BPL for the UE comprises the TRP defining a time schedule for how to time multiplex PDCCH transmissions between the active TRP TX beam (e.g., the TRP TX beam selected in step 302) and the monitored BPL and signals this info to the UE; the TRP then transmits the PDCCH using the active and monitored BPLs according to the time schedule. More specifically, for example, in step 306 the TRP performs process 700 (see FIG. 7 of the 62/417,633).

In step 308, the TRP continues using a baseline beam management procedure for the UE.

In one embodiment, the transmit buffer status information indicates an amount of data in the a DL transmit buffer waiting for transmission to the UE, and the TRP classifies the data session into a first classification (e.g., a "short" data session classification) if the amount of data is less than a first threshold and the TRP classifies the data session into a second classification (e.g., a "long" data session classification) if the amount of data is greater than a second threshold.

In another embodiment, the transmit buffer status information indicates an amount of data in the a UL transmit buffer waiting for transmission from the UE to the TRP, and the TRP classifies the data session into the first classification if the amount of data is less than a first threshold and the TRP classifies the data session into the second classification if the amount of data is greater than a second threshold.

In another embodiment, the transmit buffer status information indicates an the total amount of data in the DL transmit buffer and the UL transmit buffer combined, and the TRP classifies the data session into the first classification if the amount of data is less than a first threshold and the TRP classifies the data session into the second classification if the amount of data is greater than a second threshold.

Figure 4:
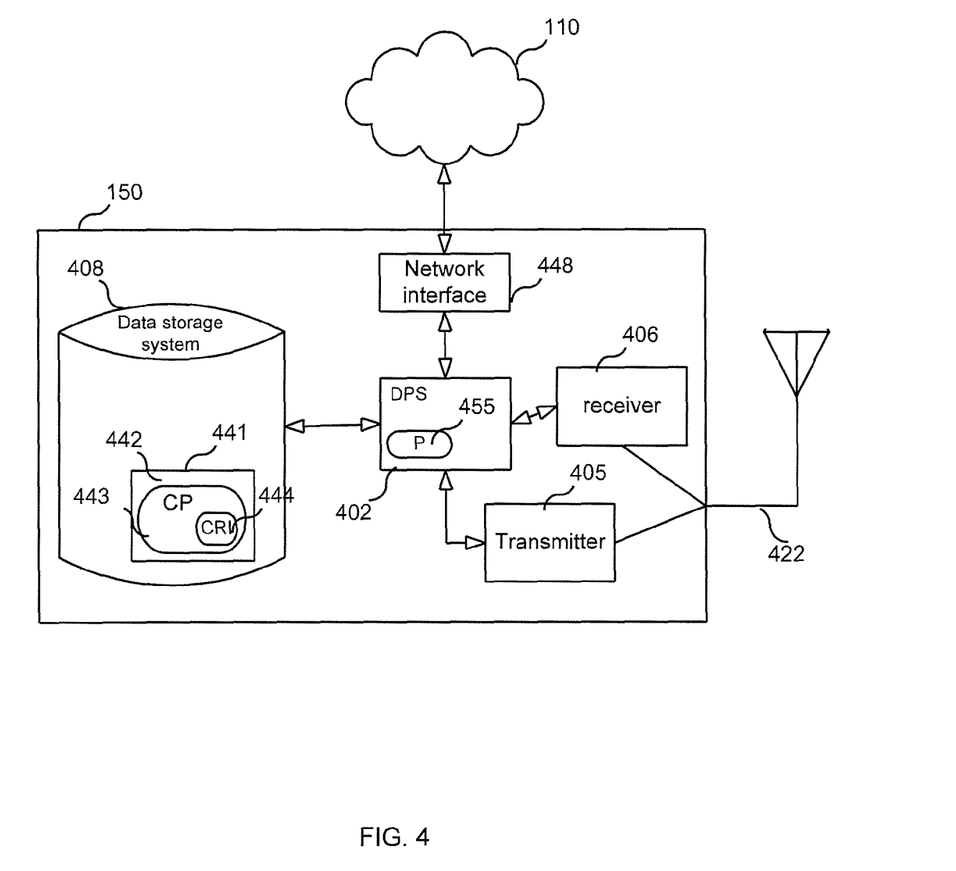
FIG. 4 is a block diagram of TRP according to some embodiments.

FIG. 4 is a block diagram of a TRP 150 according to some embodiments. As shown in FIG. 4, the TRP may comprise: a data processing system (DPS) 402, which may include one or more processors (P) 455 (e.g., a general purpose microprocessor and/or one or more other processors, such as an application specific integrated circuit (ASIC), field-programmable gate arrays (FPGAs), and the like); a transmitter 405 and a receiver 406 coupled to an antenna 422 for use in wirelessly communicating with a UE; a network interface 448 for use in connecting TRP 150 to a network 110 (e.g., an Internet Protocol (IP) network) so that TRP 150 can communicate with other devices connected to network 110, and local storage unit (a.k.a., "data storage system") 408, which may include one or more non-volatile storage devices and/or one or more volatile storage devices (e.g., random access memory (RAM)). In embodiments where the TRP includes a general purpose microprocessor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, but not limited, to magnetic media (e.g., a hard disk), optical media (e.g., a DVD), memory devices (e.g., random access memory), and the like. In some embodiments, the CRI 444 of computer program 443 is configured such that when executed by data processing system 402, the CRI causes the TRP to perform steps described above (e.g., steps described above with reference to the flow charts). In other embodiments, the TRP may be configured to perform steps described herein without the need for code. That is, for example, data processing system 402 may consist merely of one or more ASICs. Hence, the features of the embodiments described herein may be implemented in hardware and/or software.

While various embodiments of the present disclosure are described herein (including the appendices), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

DL—Downlink
UL—Uplink
TRP—Transmission/Reception Point
UE—User Equipment
NW—Network
BPL—Beam pair link
BLF—Beam pair link failure
BLM—Beam pair link monitoring
BPS—Beam pair link switch
RLM—radio link monitoring
RLF—radio link failure
PDCCH—Physical Downlink Control Channel
PUCCH—Physical Uplink Control Channel
PDSCH—Physical Downlink Shared Channel
PUSCH—Physical Uplink Shared Channel
RRC—Radio Resource Control
CSI—Channel State Information
CRS—Cell-specific Reference Signal
CSI-RS—Channel State Information Reference Signal
CRI—CSI-RS Resource Indicator
RI—Rank Indicator
PMI—Precoding Matrix Indicator
CQI—Channel Quality Indicator
RSRP—Reference signal received power
RSRQ—Reference signal received quality
gNB—NR base station
BSR—Buffer Status Report
Tx—Transmit
Rx—Receive
RACH—Random Access Channel
MIMO—Multiple Input Multiple Output
D-MIMO—Distributed-MIMO

APPENDIX

The present application claims priority to U.S. provisional application No. 62/444,064, filed on Jan. 9, 2017, which included an Appendix A containing a contribution document. The relevant portion of that Appendix A is reproduced below:

1. Introduction

In RAN1 #87, the following agreements were made in the area of beam management:

---

Agreements:
    NR supports with and without a downlink indication to derive QCL assumption for assisting UE-side beamforming for downlink control channel reception
        FFS: details
            E.g., QCL assumption details
            E.g., indication signaling (e.g. DCI, MAC CE, RRC, etc.)
            E.g., beam-related indication for DL control and data channels
Agreements:
    NR to provide robustness against beam pair link blocking
        Study mechanisms to achieve the above purpose
            E.g., by enabling PDCCH/PDSCH monitoring with N beams
                E.g., N = 1, 2, . . .
            E.g., TDM monitoring, simultaneous monitoring, etc.

| |
|---|
| E.g., by enabling composite beams via e.g., SFBC and/or multi-stage control channel |
| The examples are not intended to be exhaustive |

In this contribution, we provide an overview of beam management operation (L1/L2 procedure using CSI-RS) that continues the discussion in [1] from the last meeting and incorporating the above agreements. The intention is to provide context to Ericsson's proposals in other contributions.

2. Discussion

In [1], an overview of beam management was given, and the notion of a "toolbox" of procedures was introduced to cover the wide range of deployment scenarios envisioned for NR. The beam management framework was discussed in the context of which procedures from the toolbox could be used to handle increasing levels of beam management accuracy making use of the P1, P2, and P3 procedures agreed previously in RAN1.

While this contribution focuses on DL beam management, in a companion contribution [2], we discuss UL beam management using procedures U1, U2, and U3 based on configuration of multiple SRS resources at the UE. UL beam management may be required in addition to DL beam management in cases where Tx/Rx beam correspondence does not hold at the gNB and/or UE. If Tx/Rx correspondence does hold, UL beam management could be used as a replacement for DL beam management; however, this may depend on the deployment scenario.

In this contribution, we elaborate on the DL beam management framework in [1] and introduce the notion of a "baseline" beam management procedure and an "extended" beam management procedure drawing on tools from the toolbox. Broadly speaking, the baseline procedure applies to a coarse level of accuracy and the extended procedure to an increased level of accuracy. The baseline procedure is appropriate for short data sessions where only a small amount of data is transmitted in downlink and/or uplink. The key in the baseline procedure is to quickly find a suitable (coarse, good enough) beam pair link, deliver the data in one or only a few transmission opportunities, and then go back to IDLE or RRC_INACTIVE. In the baseline, the focus is on quick, opportunistic data delivery rather than on robustness and throughput optimization. In today's networks, the traffic profile is such that a very large fraction of data sessions, e.g., 90%, are short. Hence it is envisioned that the baseline procedure is used in most cases.

Observation 1: Most packets in today's network are small and appear bursty, which implies that some baseline beam management should be in place to handle these packets without extensive beam management procedures.

In contrast, the extended procedure applies to an enhanced level of accuracy, and is appropriate for longer data sessions. In this case, the UE spends more time in the RRC_CONNECTED state, allowing the network to build in robustness and data throughput optimizations for both the control and data channels before the UE goes back to IDLE or RRC_INACTIVE. The division between short and long is not necessarily clear cut; however, the network has visibility on what procedures to invoke (baseline or extended), for example, using its knowledge of buffer states in both the DL and the UL. In the latter, the network is made aware of buffer state through regular buffer status reports once the UE is in connected mode.

Relevant components of the baseline and extended beam management procedures are as follows.

2.1. Baseline Procedure

The baseline procedure is characterized by the establishment of a single beam-pair link (BPL) to be used for both control (PDCCH and PUCCH) and data transmission (PDSCH and PUSCH). A BPL consists of the link between the gNB and a UE considering a particular gNB Tx beam and UE Rx beam. The establishment procedure is transparent to the UE in the sense that no explicit downlink signalling is used to inform the UE of what gNB Tx beam is used or what UE Rx beam should be used. Hence, this is the case of operation without downlink indication as in the above agreement.

To enable this, the gNB transmits a sweep of multiple beamformed CSI-RS resources. The transmission can be aperiodic, semi-persistent, or periodic depending, for example, on the system load. gNB Tx beam selection is accomplished through CSI-RS Resource Indicator (CRI) feedback from the UE, similar to Class B, K>1 operation in LTE. The feedback also includes CSI (RI/PMI/CQI) to allow direct scheduling of the UE. Alternatively, only a CSI-RSRP feedback can be configured as the feedback from the sweep, when can be used for rudimentary, coarse link adaptation.

The baseline procedure primarily consists of procedure P1, and optionally P2/P3 for moderate-length data sessions, i.e., sessions not long enough to warrant the extended procedure.

An illustrative sequence of steps in the baseline procedure is as follows:

Step 1:

The gNB configures the UE to measure and report on multiple (K) beamformed periodic CSI-RS resources when the UE transitions from IDLE to CONNECTED, or when the UE hands over to a new cell. For example, the different resources correspond to different gNB Tx beams that cover the whole service area for the gNB. In LTE, this configuration occurs in the RRC Connection Setup procedure (part of Msg4) or the RRC Connection Reconfiguration procedure as part of a handover. Covering the whole service area in a semi-persistent/periodic beam sweep is efficient for the case of moderate to high load where there are a sufficient number of UEs undergoing state changes and/or handover. At low load, it could be more efficient (in terms of resource utilization) to rely on aperiodic CSI-RS transmission on a UE specific basis. In this case, if the gNB has some rough a priori knowledge of user location, e.g., a coarse beam direction obtained during the RACH procedure, then the beamformed CSI-RS resources could be constrained to cover a local area around the coarse beam direction; however, this is transparent to the UE.

Step 2:

The UE determines an initial UE Rx beam without dedicated NW assistance. Unless the UE has some a priori knowledge of a suitable beam direction, it will need to use a wide beam. Hence the system must be dimensioned to ensure sufficient PDCCH coverage even if the UE is not using Rx beamforming.

Step 3:

Depending on the configuration, the UE reports CRI indicating the best gNB Tx beam in combination with CSI (RI/PMI/CQI) for that beam, or RSRP for multiple of the K beams. The UE will likely need to use a wide beam for transmission of the CSI report, e.g., over PUCCH. Likewise, the gNB will most likely need to use a wide Rx beam for reception of the CSI report. Hence the system must be dimensioned to ensure sufficient PUCCH coverage even without UE Tx and gNB Rx beamforming.

Step 4:

The gNB updates it transmit beam based on the UE report and uses that beam for both PDCCH and PDSCH transmissions taking into account the reported CSI. No explicit DL signalling is necessary to indicate the updated gNB Tx beam. In addition, the gNB may use the same beam direction for future reception of PUCCH/PUSCH as long as Tx/Rx correspondence holds at the gNB.

Step 5:

The gNB determines the expected duration of the data session, for example, through its observability of DL/UL buffer status. Since much of the traffic consists of short data sessions, it may often happen that all data has been delivered in one or at most a few slots. If so, then the baseline procedure as described above is all that is necessary for a given UE. For longer data sessions, but not long enough to invoke the extended procedure described in the next section, it may be beneficial to refine the established beam pair link. If so, the BPL may be refined using procedures P2 and/or P3.

Step 6:

Optionally refine the BPL using P2 and/or P3:

Step 6a

The gNB triggers a UE Rx beam sweep based on configuring one or more aperiodic (UE specific) beamformed CSI-RS resources. For example, if the CSI-RS resources are drawn from an RRC configured pool, the pre-configuration may be performed at the same time as initial connection setup (described above). Then, the needed CSI-RS resources for this step could be dynamically allocated from the pool when needed. The beamformed CSI-RS resources are constrained to cover a local area around the previously used gNB Tx beam. In this procedure, each CSI-RS beam is fixed for some number of time units while the UE tries different Rx beams.

Step 6b:

The UE feeds back CRI indicating the best gNB Tx beam and simultaneously updates its own Rx beam. The CRI report is accompanied by a CSI report corresponding to the refined BPL.

Step 6c:

The gNB updates its Tx beam based on the CRI report from the UE. This refined BPL is used for the remaining PDCCH/PDSCH transmissions in the data session.

2.2 Extended Procedure

The extended procedure is intended for long data sessions where there is time to build in extra robustness for PDCCH transmission and optimize PDSCH transmissions. The procedure is characterized by establishment of at least a second beam-pair link (BPL) to be used for PDCCH robustness purposes (see [3]). The first BPL is referred to as the "active BPL," and the second (backup) one as the "monitored BPL." The purpose of having two links is for recovery from sudden blocking events that can occur at mmW frequencies. The approach proposed in [3] is for the UE to periodically search for PDCCH transmissions on the monitored BPL with a relatively low duty cycle, e.g., 1 in 10 slots. The periodicity is agreed between gNB and UE such that the UE knows to switch its Rx beam to search for the PDCCH on the monitored BPL during the appropriate slot. In this way, if the active BPL is blocked, PDCCH still gets through. This can be detected at the gNB, and if the blockage continues, the gNB can switch BPLs such that the monitored BPL becomes the new active BPL. Maintaining two BPLs and possibly switching between them requires the use of a BPL identifier, or tag, for the gNB to indicate to the UE which BPL is updated on an ongoing basis. Hence, this is the case of operation with downlink indication as in the above agreement.

Proposal: NR supports dynamic indication of an identifier to distinguish between two or more beam pair links maintained by the gNB/UE.

An illustrative sequence of steps in the extended procedure is as follows:

Step 1:

The gNB triggers a refinement of the first (active) BPL using the same procedure as in Step 6 above (P2 and/or P3 procedures), except that when the CSI measurement is triggered, the gNB also transmits an identifier to the UE, e.g., 2 bits, which is used to indicate which BPL is being updated. For example, the 2-bit identifier could be set to '00' which is reserved for the active BPL.

Step 2:

The UE stores (remembers) the refined Rx beam setting according to the identifier for the active BPL.

Step 3:

The gNB triggers the establishment of a second (monitored) BPL using the same procedure as in Step 6 above, except that it avoids using the same gNB Tx beam as the active BPL. Furthermore, it may configure a beam sweep over a wider area than that used to refine the active BPL in order to discover a new link. Along with the CSI measurement trigger, the gNB transmits a 2-bit identifier with value set, e.g., to '01' to indicate that the gNB Tx beam and UE Rx beam is being updated for the monitored link.

Step 4:

The UE stores (remembers) the Rx beam setting according to the identifier for the monitored BPL. The UE then switches back to the Rx beam used for the active BPL for reception of the next PDCCH transmission.

Step 5:

On as "as needed" basis, the gNB triggers further refinements/updates of both the active and monitored BPLs using the same process as above.

Step 6:

The UE searches for PDCCH transmissions most of the time on the active BPL.

With a lower duty cycle (agreed between gNB and UE), the UE searches for PDCCH transmissions on the monitored BPL for one or a few slots. In the case that the active BPL becomes blocked, PDCCH transmission may still be received by the UE as long as the monitored BPL does not suffer a similar blocking.

Step 6a:

If the active BPL remains blocked, the gNB may trigger a switch of the BPLs such that the monitored BPL becomes the new active BPL and transmit an indication to the UE at the next possible monitoring instance. The UE responds by switching its Rx beams such that the PDCCH is monitored most often on the new active BPL and less frequently on the new monitored BPL.

Step 6a:

The gNB may then trigger an update of the monitored BPL to find a better (unblocked) link.

Step 7:

If both BPLs become blocked (catastrophic condition) then the UE may declare a radio link failure and initiate an RRC Connection Re-establishment procedure as in LTE. This process is UE initiated through a RACH attempt to the previous or a new cell. Once re-connected, the beam management process starts again with the baseline procedure and moves to the extended procedure if still needed.

Step 8:

In addition to establishing active/monitored links for PDCCH robustness, the gNB may establish a $2^{nd}$ active BPL, not to be used for PDCCH transmissions, using a different identifier value, e.g., '11.' The additional active link may be used for optimizing PDSCH performance. For example, higher rank transmission could be supported for D-MIMO or multi-panel transmission. Since the establishment of BPLs may take some time, this optimization is intended for longer data sessions, thus fits better in the extended, rather than baseline procedure.

3. Conclusions

In this contribution we made the following observation:

Observation 1: Most packets in today's network are small and appear bursty, which implies that some baseline beam management should be in place to handle these packets without extensive beam management procedures.

Based on the discussion in this contribution we propose the following:

Proposal 1: NR supports dynamic indication of an identifier to distinguish between two or more beam pair links maintained by the gNB/UE.

REFERENCES

[1] R1-1612345, "Beam management overview," Ericsson, RAN1 #87, November 2016.
[2] R1-1700749, "On UL beam management," Ericsson, RAN1 #87ah-NR, January 2017.
[3] R1-1700748, "On robust beam management," Ericsson, RAN1 #87ah-NR, January 2017.

The invention claimed is:

1. A method for beam management, the method comprising:
   a transmission point classifying a data session between the transmission point and a user equipment (UE) into one of at least two classifications, the at least two classifications including a long data session and a short data session; and
   the transmission point selecting a beam management procedure for managing one or more beam pair links between the transmission point and the UE based on the classification into which the data session is classified.

2. The method of claim 1, wherein the transmission point classifies the data session based on i) transmit buffer status information indicating a status of one or more of a DL transmit buffer and an UL transmit buffer and/or ii) information received from the UE.

3. The method of claim 2, wherein the transmission point classifies the data session based on the information received from the UE.

4. The method of claim 3, wherein the information received from the UE indicates indirectly that that data session is a long data session.

5. The method of claim 3, wherein the information received from the UE explicitly requests extended beam management.

6. The method of claim 2, wherein the transmission point classifies the data session based on the transmit buffer status information.

7. The method of claim 6, wherein:
   the transmit buffer status information indicates an amount of data in one or both of:
      the DL transmit buffer waiting for transmission to the UE, and
      the UL transmit buffer waiting for transmission to the transmission point;
   the transmission point classifies the data session as a short data session if the amount of data is less than a first threshold; and
   the transmission point classifies the data session as a long data session if the amount of data is greater than a second threshold.

8. The method of claim 6, wherein
   the transmit buffer status information indicates a total amount of data in a DL transmit buffer waiting for transmission to the UE and an UL transmit buffer waiting for transmission to the transmission point combined,
   the transmission point classifies the data session as a short data session if the total amount of data is less than a first threshold, and
   the transmission point classifies the data session as a long data session if the total amount of data is greater than a second threshold.

9. The method of claim 1, further comprising:
   before classifying the data session, the transmission point selecting a first transmit, TX, spatial filtering configuration to use to communicate data to the UE.

10. The method of claim 9, wherein selecting the beam management procedure comprises determining whether to use a second TX spatial filtering configuration for communicating data to the UE.

11. The method of claim 10, wherein
    the transmission point determines to use the second TX spatial filtering configuration as a result of classifying the data session as a long data session, and
    after determining to use the second TX spatial filtering configuration, the transmission point selects the second TX spatial filtering configuration.

12. A method for beam management, the method comprising:
    a transmission point (TRP) selecting a first transmit (TX) spatial filtering configuration for use in transmitting data to a user equipment (UE) as part of a data session with the UE;
    the transmission point determining whether the data session with the UE should be classified as a long data session; and
    as a result of determining that the data session with the UE should be classified as a long data session, establishing a second TX spatial filtering configuration for the UE.

13. The method of claim 12, wherein establishing the second TX spatial filtering configuration for the UE comprises defining a time schedule for transmitting physical downlink control channel transmissions using the first and second TX spatial filtering configurations.

14. The method of claim 13, further comprising the transmission point transmitting to the UE scheduling information regarding the defined time schedule.

15. The method of claim 14, wherein the scheduling information indicates a slot in which a transmission point may transmit control information to the UE using the second TX spatial filtering configuration.

16. The method of claim 12, wherein determining whether the data session with the UE should be classified as a long data session comprises obtaining transmit buffer status information, the obtained transmit buffer status information indicates an amount of data in one or both of:

a DL transmit buffer waiting for transmission to the UE, and an UL transmit buffer waiting for transmission to the transmission point, and the transmission point determines that the data session should be classified as a long data session as a result of determining that the amount of data is greater than a threshold.

17. The method of claim 12, wherein the transmission point determines that the data session with the UE should be classified as a long data session as a result of receiving certain information from the UE.

18. The method of claim 17, wherein the information received from the UE indicates indirectly that that data session is a long data session.

19. The method of claim 18, wherein the information received from the UE explicitly requests extended beam management.

20. A transmission point (TRP), the transmission point comprising:

a transmitter;

a receiver; and a data processing system comprising one or more processors, wherein the transmission point is configured to perform operations comprising:

selecting a first transmit (TX) spatial filtering configuration for use in transmitting data to a user equipment (UE), as part of a data session with the UE;

determine whether the data session with the UE should be classified as a long data session; and as a result of determining that the data session with the UE should be classified as a long data session, establish a second TX spatial filtering configuration for the UE.

\* \* \* \* \*